(12) United States Patent
Clark et al.

(10) Patent No.: US 10,496,524 B2
(45) Date of Patent: Dec. 3, 2019

(54) SEPARATING TEST COVERAGE IN SOFTWARE PROCESSES USING SHARED MEMORY

(71) Applicant: Synopsys Inc., Mountain View, CA (US)

(72) Inventors: Jonathan Clark, San Mateo, CA (US); Darren Kennedy, Calgary (CA); Sylvain François, Berkeley, CA (US); Marc Rambert, San Francisco, CA (US); Scott McPeak, San Francisco, CA (US); Marat Boshernitsan, San Francisco, CA (US)

(73) Assignee: Synopsys, Inc., Mountain View, CA (US)

( * ) Notice: Subject to any disclaimer, the term of this patent is extended or adjusted under 35 U.S.C. 154(b) by 297 days.

(21) Appl. No.: 15/389,454

(22) Filed: Dec. 23, 2016

(65) Prior Publication Data

US 2017/0192878 A1   Jul. 6, 2017

Related U.S. Application Data

(60) Provisional application No. 62/274,020, filed on Dec. 31, 2015.

(51) Int. Cl.
 *G06F 11/36* (2006.01)

(52) U.S. Cl.
 CPC ...... *G06F 11/3664* (2013.01); *G06F 11/3676* (2013.01); *G06F 11/3684* (2013.01); *G06F 11/3688* (2013.01)

(58) Field of Classification Search
 CPC ............ G06F 11/3684; G06F 11/3688; G06F 11/3664; G06F 11/3672
 See application file for complete search history.

(56) References Cited

U.S. PATENT DOCUMENTS

| | | | |
|---|---|---|---|
| 6,594,736 B1* | 7/2003 | Parks ................. | G06F 12/0815 709/217 |
| 2014/0245070 A1* | 8/2014 | Rumble ............. | G06F 11/3692 714/38.14 |
| 2017/0068613 A1* | 3/2017 | Edmonds ........... | G06F 11/3688 |

* cited by examiner

*Primary Examiner* — Jigar P Patel
(74) *Attorney, Agent, or Firm* — Sterne, Kessler, Goldstein & Fox P.L.L.C.

(57) ABSTRACT

A Remote Test Separation (RTS) system comprising an original software product instrumented for testing and a shared memory accessible to the original software product, the shared memory including a plurality of coverage counters. The RTS system further comprising an agent, capable of accessing the shared memory, the agent to read the plurality of coverage counters, the agent to read the plurality of coverage counters at an end of a test, and write coverage data to another memory. The RTS system runs a plurality of tests without interruption, and generates coverage data associated with a plurality of sequential tests and records the associations between lines of code and an associated test.

20 Claims, 5 Drawing Sheets

SEPARATING TEST COVERAGE IN SOFTWARE PROCESSES USING SHARED MEMORY

RELATED APPLICATION

The present application claims priority to U.S. Provisional Patent Application No. 62/274,020, filed on Dec. 31, 2015, which is incorporated herein by reference in its entirety.

FIELD

The present application relates to software testing, and more particularly to an improved method of gathering testing data.

BACKGROUND

Software products (apps) are made up of thousands (and sometimes millions) of parts. The "parts" in a software product are generally lines of code. Like lines of words in a book, lines of code are lines of instructions for a computer. For example, line one might say "add 1+2", line two might say "multiply 3×4", etc.

Testing software is complex because a software product is generally made up of so many lines of code. To reduce complexity, the testing of the entire app is broken down into much smaller individual tests. For example, in a calculator app, there would be individual tests for addition, subtraction, multiplication, etc.

Knowing the association between lines of code and tests in a software app is valuable. It enables simplifying testing, if parts of the software application are changed, without requiring retesting of the entire application. So knowing the association between parts and tests can save a company a lot of time. And time is money.

In the prior art, in order for software testing systems to record an association between a test and the associated line(s) of code, the software application has to be stopped after each test.

But there is a problem. Starting and stopping the software application for each test is time consuming. It would be a lot faster (and cheaper) to start the software application once, perform all the tests and then stop the application. However, the instrumentation, in the prior art, only permits recording the test when the software application is stopped.

As long as a software app is started and stopped for each test, the recorded lines of code can easily be associated with each test. However, in the prior art, there is no way to start the software app once, perform multiple tests, and have the recorded lines of code associated with the correct individual tests.

Because many software apps take *minutes* to start up. Starting and stopping the software app for hundreds and thousands of individual tests is simply not practical.

BRIEF DESCRIPTION OF THE FIGURES

The present invention is illustrated by way of example, and not by way of limitation, in the figures of the accompanying drawings and in which like reference numerals refer to similar elements and in which.

DETAILED DESCRIPTION

Figure 1:
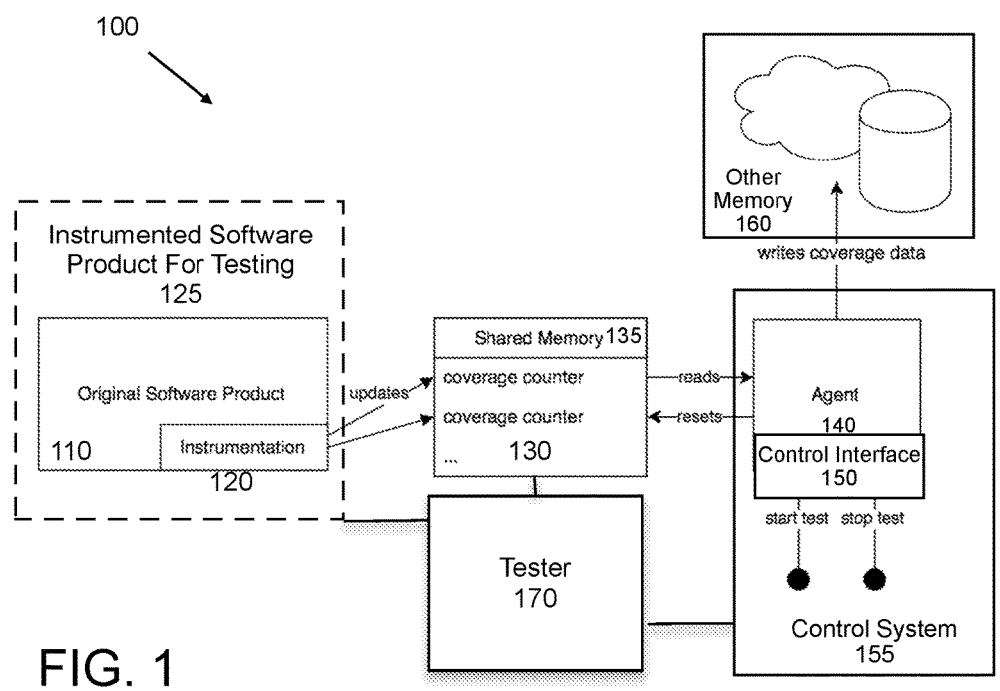
FIG. 1 is a block diagram of one embodiment of the system architecture.

The Remote Test Separation (RTS) system in one embodiment allows testers to send "start" and "stop" messages to the software app being tested. On a "start" message, a "clean piece of paper" is started. On a stop message, all the recorded lines of code are associated with the test that was just performed between the start/stop messages. This allows the software app to be started once, perform all the tests, and finally to stop the software app once. When this is complete, the system has the associations between lines of code and tests that were performed.

Many companies have software apps that take a long time to start. Until now, these companies could not record the associations between lines of code and tests because it would simply take too long to start/stop their app for each test. Other alternatives have similar problems. For example:

Start/stop long-running processes during each test: Restarting such processes is often infeasible due to non-trivial deployment or initialization costs.

Manually modify product to support test demarcation: This alternative requires engineering effort and permanent product changes.

Coverage data trace: Generate a continuous stream of coverage data. This approach generates an impractical quantity of output data and has a high run-time performance cost.

Coverage data sampling: Periodically sample the coverage data. This alternative results in a much larger output size and reduced precision.

Asynchronous signal handling instead of external agent: Asynchronous signals are not available on all platforms, and may interfere with the operation of instrumented software products.

Therefore, they could not benefit from knowing these associations. The RTS system solves the aforementioned problems. Advantageously, the RTS system does not require processes to be restarted. The RTS system, in one embodiment, offers the same quality as prior coverage data trace methods, but with greatly reduced run-time overhead and output size.

The RTS system can be applied to a software product without permanent changes to that product. The RTS system is generally applicable and does not alter the operation of products, in one embodiment. The RTS system in one embodiment modifies the original software product, to add instrumentation to accumulate test coverage in a shared memory data structure, but the external behavior of the original software product is unaltered.

Typically, coverage data processing is performed as part of the instrumented software product. The RTS system performs comparable coverage data processing within a separate component, reducing the performance cost of test coverage measurement.

By adding an external signaling mechanism to the instrumented software product, the RTS system can demarcate tests by issuing "start test" and "stop test" directives immediately before and after executing a single test. In one embodiment, the directives may be issued using an automated test script. Coverage data corresponding to the specific test is collected following the issuance of a "stop test" directive. This coverage data measures the portion of the original software product source code executed during the specific test, without requiring the termination or restart of the instrumented software product. The software product is instrumented to accumulate coverage data inside a shared memory data structure. An external software agent ("thread" or "process" in one embodiment) waits for a "start test" or "stop test" directive. When such a directive has been received, the external agent reads the collected data from the shared memory data structure, stores it, and then resets the coverage data structure to a default (empty) state. Using the RTS system, it is now possible to enjoy the benefits of knowing these associations without starting or stopping the original software program for each test. In this way, the association data can be gathered without impacting the software application itself, requiring it to start or stop.

There are some significant benefits of knowing the association between lines of code and tests. First, when a "part" (one or more lines of code) is changed, only the tests associated with that part need to be rerun, saving companies time and money. Second, gaps in testing can be identified, by subtracting the lines of code executed by the tests from the total set of lines of code that make up the app. Gaps in testing represent real risk for companies. Once companies are aware of these gaps, they can perform additional testing on the untested lines of code to reduce the risk that their software app won't perform as intended.

In one embodiment, this system can be applied to a software product without permanent changes to that product, and with limited human intervention. While the system modifies the original software product to accumulate test coverage in a shared memory data structure, the external behavior of the product is unaltered.

Typically, coverage data processing is performed as part of the instrumented software product. In one embodiment, the software application described performs comparable coverage data processing within a separate component, reducing the performance cost of test coverage measurement. The specific use of the software product tested in this way is not limited. The language that the original software product is written in is not limited either.

The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Remote Test Separation (RTS) improves upon a tradition of test coverage tools. The distinguishing feature of Remote Test Separation is when the coverage data is written. Traditional coverage tools write coverage data when the instrumented process exits. Remote Test Separation instead writes the coverage data when it is directed to do so, during the testing process. In one embodiment, three key innovations make Remote Test Separation possible, (1) Coverage counters in shared memory, (2) Concurrent agent listening for commands, and (3) a control interface.

Using an RTS system to create an association between the test and the commands/code enables improvements in later testing. In particular it improves test prioritization, test scoring, and improved design tools for future test design.

These features are described in detail in the following sections, along with other implementation details that will be shared among most coverage tools, but necessary for understanding how Remote Test Separation functions. It should however be understood that the specifics of implementation described below may be varied without departing from the broader scope of the present disclosure, which is designed to improve the software testing process.

FIG. 1 is a block diagram of one embodiment of the system architecture for an RTS system 100. In one embodiment, the Remote Test Separation system 100 consists of five components, described in detail in the following sections.

The Original software product 110 is the source code of which coverage measurement/testing is desired. In one embodiment, the original software product 110 is provided by a user. Alternatively, the original software product 110 may be provided by another testing system, or tool. The original software product 110 may be written in C/C++ or any other computer language, including hardware description language (HDL). It may be executed locally or remotely.

Instrumentation 120 are modifications made to the original software product 110, such that the resulting instrumented software product 125 stores test coverage information with in-memory coverage counters. Tester 170 runs the plurality of tests.

Coverage counters 130 are portions of computer memory representing the coverage state of a particular software feature, concurrently accessible by both the instrumented software product 125 and an agent 140. In one embodiment, coverage counters 130 are implemented in a shared memory 135.

The Agent 140 is an external computer program running concurrently with the instrumented software product 125, in one embodiment. The agent 140 reads the coverage counters 130 and writes them out, based upon commands from a control interface 150, to other memory 160.

The Control interface 150 is an external interface operated by an external actor, such as a human user, an automated test script, or a computer program, which is used to demarcate tests via 'start test' and 'stop test' directives. The agent 140 and Control interface 150 together form the control system 155, which obtains data from shared memory 135 and writes it to other memory 160.

At a high level, the instrumented software product 125 continuously updates coverage counters 130 in memory 135, indicating the portions of the original software 110 that have been recently used by tester 170. This is typical for coverage tools. Unlike other coverage tools, however, those coverage counters are located in shared memory 135, which is accessible to an external agent 140 during the testing. The agent 140, running concurrently with the instrumented software product 125, is able to access those coverage counters 130 and collect them in a way that associates them with the particular test being run.

In one embodiment, the agent 140 listens on an inter-process communication channel for a 'start test' and/or 'stop test' command. When the agent 140 receives such a command, the agent 140 reads the values stored in the coverage counters 130 and writes out a copy of the coverage counters 130 into another memory 160.

Figure 3:
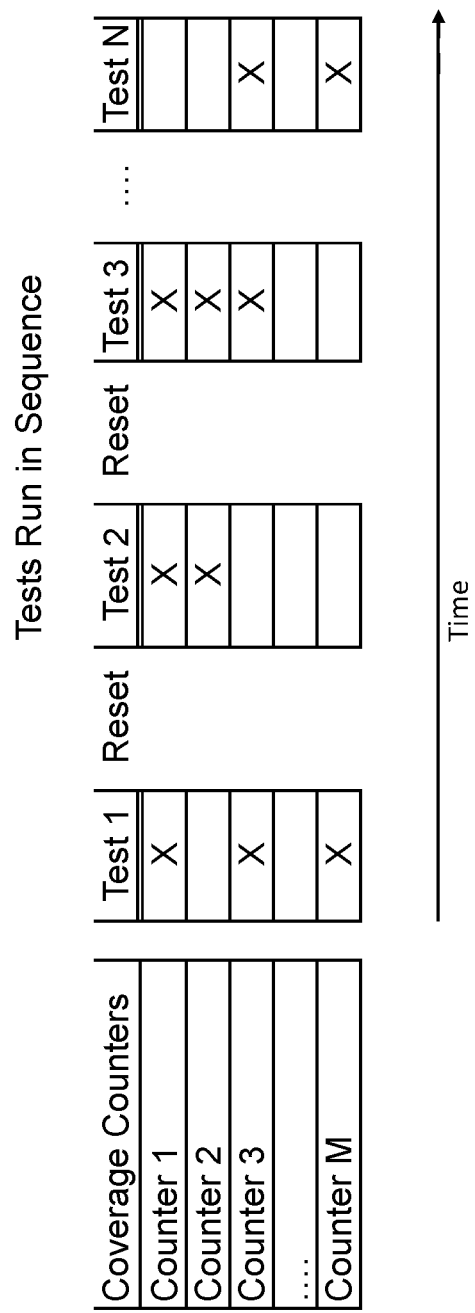
FIG. 3 is a diagram showing one embodiment of a timeline of a shared memory storing the coverage data.

FIG. 3 is a timeline of one embodiment of the shared memory, storing the coverage data. In one embodiment, there is a counter for each code segment, and the test indicates whether the counter has been triggered (e.g. the test impacts the particular code segment.) In the example shown in FIG. 3, a set of M coverage counters are shown, for N tests. In this case, the coverage counter is a simple binary (tested indicated by an X, or not tested indicated by remaining blank). Thus, test 1 tested the source code features associated with counter 1, counter 3, and counter M.

Returning to FIG. 1, between each test, the agent 140 reads out the data to other memory 160 and resets the counters 130. Because the agent 140 resets all of the coverage counters 130 to a default (uncovered) state at the end of each test; subsequent tests accumulate coverage from a 'clean slate'.

By repeatedly issuing 'start test' and 'stop test' commands, then inspecting the produced coverage data, the test coverage is effectively separated by individual test without needing to restart the instrumented software product.

Like any other coverage tool, Remote Test Separation system 100 utilizes a user-provided original software product for which test coverage measurement is desired. This original software product is modified to collect coverage information as various source code features are executed. The coverage information is temporarily accumulated inside the coverage counters 130 and uniquely associated with those features using the agent 140.

Each coverage counter is associated with a source code feature. A source code feature is any idea expressed by the source code or executable code of the original software product. This includes, but is not limited to, individual machine instructions, individual tokens and glyphs, variables, and higher-level constructs such as functions, lines of code, or branch conditions. Any such source code feature may be uniquely associated with a coverage counter and instrumented to set this counter upon execution.

Example code, for typical function coverage, in C:

```
extern char *foo_coverage_state; // injected: address of coverage counter
...
void foo( )
{
    *foo_coverage_state = 1; // injected: set coverage counter value
```

In one embodiment, a coverage counter is a discrete region of computer memory uniquely associated with an instrumented feature of the original software product. An instrumented software product may use any number of coverage counters associated uniquely with any number of software features. In one embodiment, coverage counters may overlap. For example, there may be a coverage counter for a function, and within that function a particular condition.

In one embodiment, each coverage counter stores a value encoding how the associated software feature has been used, by the currently executed lines of code. Each coverage counter has a default state to which it can be reset at any time, and is reset between tests.

In one embodiment, Remote Test Separation system may use 1-bit coverage counters storing either 0, indicating there is no coverage, or 1, indicating coverage. Restoring the value to 0 resets these counters.

In another embodiment, the RTS system may use a larger sized counter as the coverage counter, and store a count of the number of times a feature has been used. In another embodiment, coverage tools may use discrete values to encode other information about how a feature was used in the coverage counter, in addition to whether or not it was used.

In one embodiment, for modified condition/decision coverage (MC/DC), the counters may track discrete values to encode which conditionals (Boolean sub-expression) have independently affected the outcomes of each decision. In one embodiment, the counters may record whether a function/code block has been tested with each argument/variable set to some value. For example, the system may verify that integer-taking functions are tested with negative, positive, and zero values. The system may utilize discrete values to encode that the function has or has not been called with negative, positive, and zero values.

In one embodiment, the counters may be used to record the total amount of time spent inside each basic block, recursively; record the total number or sizes of memory allocations performed by each basic block, recursively.

The counters may record a code execution trace, in whole or in part. For example, the counters may also record a sequence of functions that have been called. Such a trace could include function argument values, the call stack, states of global variables or the process environment.

In one embodiment, the system may perform some type of dynamic dataflow analysis, for example dynamic taint analysis. This would utilize additional discrete values to track the origins of the data contained by programming language variables or memory regions. Other ways of implementing the coverage counter, and tracking other aspects of the coverage, may also be utilized.

The coverage counters in the Remote Test Separation system are concurrently accessible by the instrumented software product and the external agent software. Such concurrently accessible memory regions are commonly termed shared memory within the software industry, although the specific implementation of the shared memory may differ across platforms and use cases. Examples of shared memory which may be used with the Remote Test Separation system include, but are not limited to:

The process address space, as shared among multiple threads executing within a single process.
The process address space, as inherited via the clone system call.
Memory-mapped file I/O (input/output)
XSI shared memory (X/Open System Interfaces)

In one embodiment, the Remote Test Separation product uses process address space shared among multiple threads. Other embodiments may use other types of shared memory.

The agent executes concurrently with the instrumented software program. The agent is responsible for exposing the control interface, handling commands, and exporting coverage information. The agent may execute as either an additional process, or as a thread within the same process as the instrumented software product.

The agent awaits delivery of Remote Test Separation control commands. Commands may be delivered to the agent using any interprocess communication mechanism. The specific delivery mechanism may vary by implementation. In one embodiment, the Remote Test Separation product uses network sockets for interprocess communication. Other embodiments may use one or more of the following, or other processes:

Sockets
Unix signals
Platform-provided remote procedure calls
Hardware interrupts
Shared memory (as defined above)

Pipes/FIFOs (named or anonymous)
Files or file system monitoring

The agent is responsible for handling control commands. Control commands and their semantics are defined below. The agent is also responsible for writing the coverage data from shared memory to another memory, such as a disk, a database, or a similar destination. The accumulated coverage is sourced from shared memory coverage flags, and serialization is performed on demand rather than upon the termination of the instrumented software product. In another embodiment, the agent may direct the data to another coverage counter set, rather than writing out data to a separate memory. Other ways of preserving the state of coverage counters for each test may be utilized.

Figure 2:
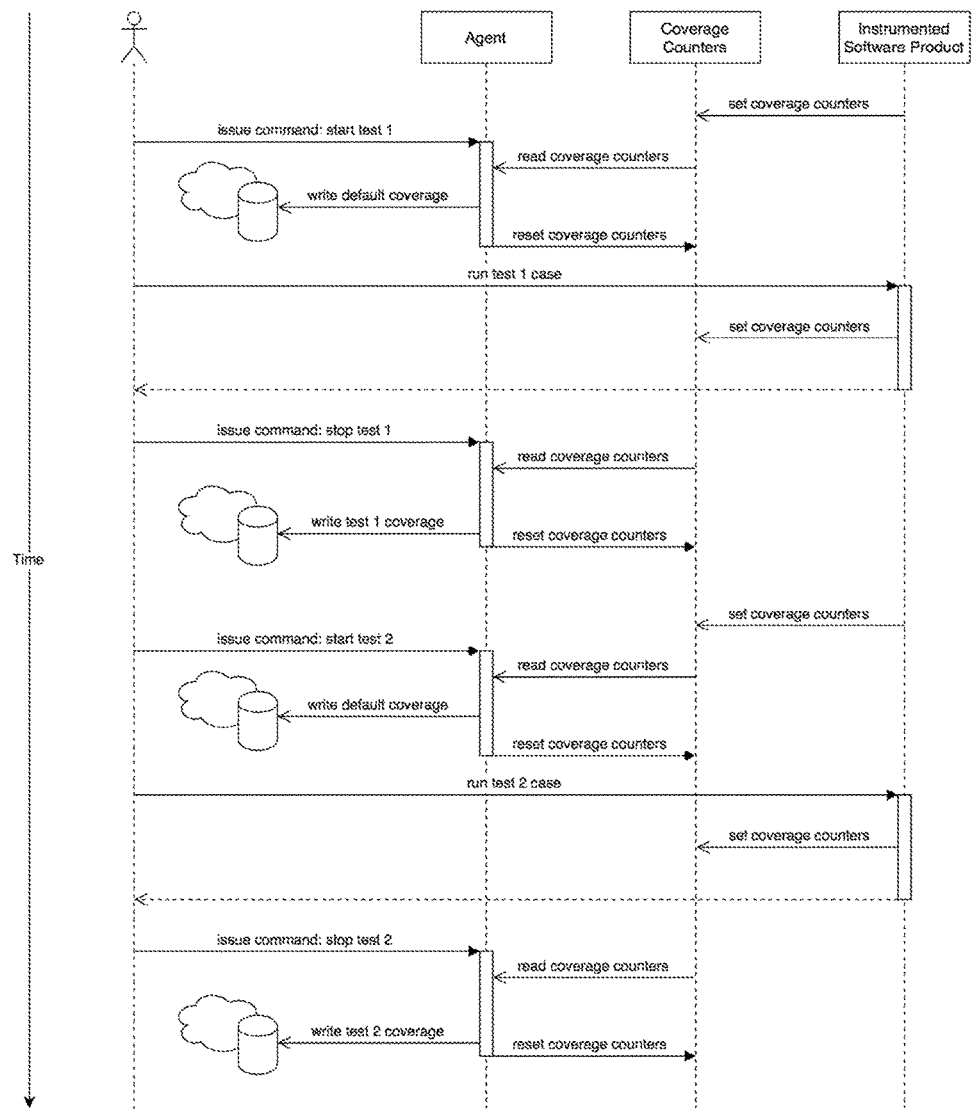
FIG. 2 is a sequence diagram illustrating one embodiment of the command data flow.

FIG. 2 is a sequence diagram illustrating one embodiment of the command data flow. Remote Test Separation in one embodiment utilizes unique identification of tests. Coverage data is associated with this unique identifier as a proxy for the conceptual test.

In one embodiment, the Remote Test Separation product uniquely identifies tests using an arbitrary user-provided string. In one embodiment, the Remote Test Separation product uses other identifiers, such as unique numbers or cryptographic hashes. Conceptually it will uniquely associate tests with some identifier.

In one embodiment, Remote Test Separation associates all coverage collected outside of "start test" and "stop test" boundaries with a virtual test, called the default test. Associating such test coverage with the default test allows Remote Test Separation to operate as a traditional test coverage tool when test boundaries are not specified by the user.

In one embodiment, one unique test identifier is reserved for associating coverage data with the default test. This special identifier is called the default test identifier. In one embodiment, the default test identifier is the string "default," which is used to identify the default test.

In one embodiment, the sequence of operations is as follows:
The agent receives the "start test" command, including a test identifier.
The values from the coverage counters are sent to a coverage data file or other recipient, and marked as belonging to the default test.
The coverage flags are all reset.
The agent locally stores the new test identifier as the active test identifier. This test identifier is used later, by the "stop test" command.
The system runs a test.
The agent receives the "stop test" command.
The agent fetches the active test identifier that was sent with the "start test" command.
The values from the coverage counters are written to a coverage data file or other destination, and marked as belonging to the test associated with the active test identifier.
The coverage flags are all reset.
The agent locally stores the default test as the current identifier (unless or until another start test is received).

The "start test" command is used to indicate the beginning of a test. The command includes a test identifier, in one embodiment, indicating the test with which the successive test coverage should be associated. The coverage counters are then reset, ensuring only newly collected coverage data will be associated with the specified test identifier.

In another embodiment, the sequence of operations is as follows. In this embodiment, no option for a default test is provided, and data received without a test identifier is not separately stored.
The agent receives the "start test" command, including a test identifier.
The agent locally stores the new test identifier as the active test identifier. This test identifier is used later, by the "stop test" command.
A test is run by the system.
The agent receives the "stop test" command.
The agent fetches the active test identifier that was sent with the "start test" command.
The values from the coverage counters are written to a coverage data file or other destination, and marked as belonging to the test associated with the active test identifier.
The coverage flags are all reset.

Figure 4:
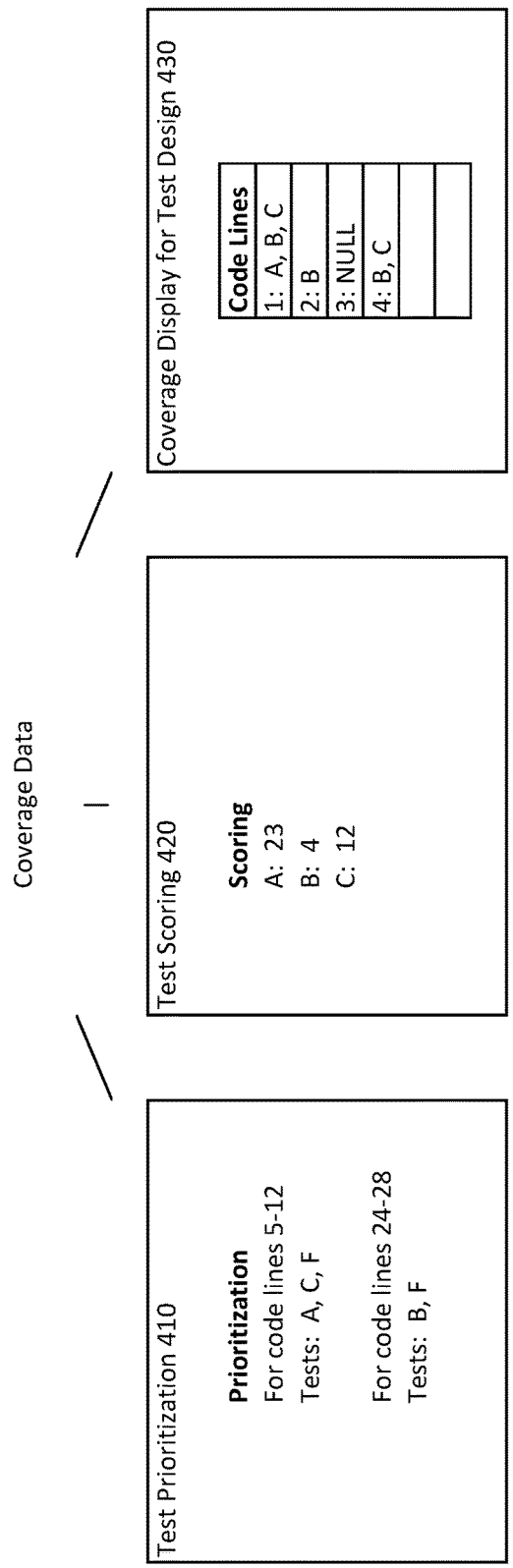
FIG. 4 is a flowchart of one embodiment of using the coverage data, for further testing or processing.

FIG. 4 is an illustration of one embodiment of using the coverage data generated by the Remote Test Separation system. Coverage data may be used for test prioritization 410. Test prioritization can be used to calculate all of the tests which utilize a particular portion of code. This enables the system to prioritize tests associated with changed lines of code. Additionally, test prioritization may be useful to prioritize tests that touch more code, or code that is more likely to be problematic. Other ways of prioritizing may be used, based on the known coverage data.

The coverage data may be used for test scoring 420. The system can calculate how many of the changed pieces of code are covered (executed) by each test. This number is called a test's "score". This may be utilized when a company does not have enough time or bandwidth to perform all their tests. Which subset of tests should they perform to maximize their testing effort? The RTS system provides the ability to sort tests in descending order by each test's score. This enables the execution of as tests from highest to lowest test score. This enables testing the maximum number of changes in a limited amount of time.

The coverage data enables a display 430 of which test covers which line. This line-based coverage may be displayed in a user interface, with indications of "covered" and "not covered" for each line. This enables a user to select a covered line and get the name of the test(s) that cover this line. When writing a test for an uncovered line, knowing which tests cover nearby lines is useful. Additionally, tests can be extended to cover uncovered lines, or can be used as a starting point for adding new tests that will cover the uncovered lines.

Other methods of utilizing coverage data to improve test utilization, test evaluation, or test design may also be used.

Figure 5:
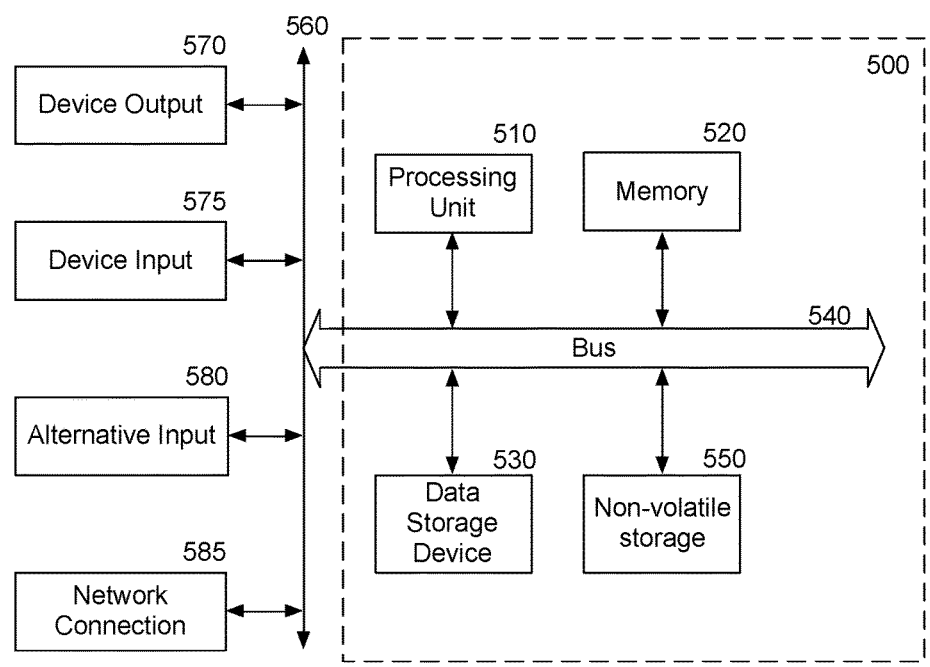
FIG. 5 is a block diagram of one embodiment of a computer system that may be used.

FIG. 5 is a block diagram of one embodiment of a computer system that may be used. It will be apparent to those of ordinary skill in the art, however that other alternative systems of various system architectures may also be used.

The data processing system illustrated in FIG. 5 includes a bus or other internal communication means 540 for communicating information, and a processing unit 510 coupled to the bus 540 for processing information. The processing unit 510 may be a central processing unit (CPU), a digital signal processor (DSP), or another type of processing unit 510.

The system further includes, in one embodiment, a random access memory (RAM) or other volatile storage device 520 (referred to as memory), coupled to bus 540 for storing information and instructions to be executed by processor 510. Main memory 520 may also be used for storing temporary variables or other intermediate information during execution of instructions by processing unit 510.

The system also comprises in one embodiment a read only memory (ROM) 550 and/or static storage device 550 coupled to bus 540 for storing static information and instructions for processor 510. In one embodiment, the system also includes a data storage device 530 such as a magnetic disk or optical disk and its corresponding disk drive, or Flash memory or other storage which is capable of storing data when no power is supplied to the system. Data storage device 530 in one embodiment is coupled to bus 540 for storing information and instructions.

The system may further be coupled to an output device 570, such as a cathode ray tube (CRT) or a liquid crystal display (LCD) coupled to bus 540 through bus 560 for outputting information. The output device 570 may be a visual output device, an audio output device, and/or tactile output device (e.g. vibrations, etc.)

An input device 575 may be coupled to the bus 560. The input device 575 may be an alphanumeric input device, such as a keyboard including alphanumeric and other keys, for enabling a user to communicate information and command selections to processing unit 510. An additional user input device 580 may further be included. One such user input device 580 is cursor control device 580, such as a mouse, a trackball, stylus, cursor direction keys, or touch screen, may be coupled to bus 540 through bus 560 for communicating direction information and command selections to processing unit 510, and for controlling movement on display device 570.

Another device, which may optionally be coupled to computer system 500, is a network device 585 for accessing other nodes of a distributed system via a network. The communication device 585 may include any of a number of commercially available networking peripheral devices such as those used for coupling to an Ethernet, token ring, Internet, or wide area network, personal area network, wireless network or other method of accessing other devices. The communication device 585 may further be a null-modem connection, or any other mechanism that provides connectivity between the computer system 500 and the outside world.

Note that any or all of the components of this system illustrated in FIG. 5 and associated hardware may be used in various embodiments.

It will be appreciated by those of ordinary skill in the art that the particular machine that implements the RTS system may be configured in various ways according to the particular implementation. The control logic or software implementing the RTS system can be stored in main memory 520, mass storage device 530, or other storage medium locally or remotely accessible to processor 510.

It will be apparent to those of ordinary skill in the art that the system, method, and process described herein can be implemented as software stored in main memory 520 or read only memory 550 and executed by processor 510. This control logic or software may also be resident on an article of manufacture comprising a computer readable medium having computer readable program code embodied therein and being readable by the mass storage device 530 and for causing the processor 510 to operate in accordance with the methods and teachings herein.

The RTS system may also be embodied in a handheld or portable device containing a subset of the computer hardware components described above. For example, the handheld device may be configured to contain only the bus 540, the processor 510, and memory 550 and/or 520.

The handheld device may be configured to include a set of buttons or input signaling components with which a user may select from a set of available options. These could be considered input device #1 575 or input device #2 580. The handheld device may also be configured to include an output device 570 such as a liquid crystal display (LCD) or display element matrix for displaying information to a user of the handheld device. Conventional methods may be used to implement such a handheld device. The implementation of the RTS system for such a device would be apparent to one of ordinary skill in the art given the disclosure of the RTS system as provided herein.

The RTS system may also be embodied in a special purpose appliance including a subset of the computer hardware components described above, such as a kiosk or a vehicle. For example, the appliance may include a processing unit 510, a data storage device 530, a bus 540, and memory 520, and no input/output mechanisms, or only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism. In one embodiment, the device may not provide any direct input/output signals, but may be configured and accessed through a website or other network-based connection through network device 585.

It will be appreciated by those of ordinary skill in the art that any configuration of the particular machine implemented as the computer system may be used according to the particular implementation. The control logic or software implementing the RTS system can be stored on any machine-readable medium locally or remotely accessible to processor 510. A machine-readable medium includes any mechanism for storing information in a form readable by a machine (e.g. a computer). For example, a machine readable medium includes read-only memory (ROM), random access memory (RAM), magnetic disk storage media, optical storage media, flash memory devices, or other storage media which may be used for temporary or permanent data storage. In one embodiment, the control logic may be implemented as transmittable data, such as electrical, optical, acoustical or other forms of propagated signals (e.g. carrier waves, infrared signals, digital signals, etc.).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

We claim:

1. A Remote Test Separation (RTS) system, comprising:
   a shared memory accessible to an original software product instrumented for testing, the shared memory including a plurality of coverage counters;
   a tester configured to:
      run a plurality of tests without starting and stopping the original software product, and
      write coverage data associated with the plurality of tests to the plurality of coverage counters at an end of each test from among the plurality of tests, the coverage data indicating associations between a plurality of software features in the original software product and each test from among the plurality of tests; and an agent, capable of accessing the shared memory, configured to:
read the plurality of coverage counters at the end of each test, and
write coverage data to another memory at the end of each test.

2. The RTS system of claim 1, wherein the agent is configured to reset the plurality of coverage counters at the end of the test.

3. The RTS system of claim 1, wherein each coverage counter from among the plurality of coverage counters is associated with a particular software feature from among a plurality of software features in the original software product.

4. The RTS system of claim 3, wherein each coverage counter from among the plurality of coverage counters is further configured to store one bit to indicate whether the particular software feature was used in the test.

5. The RTS system of claim 3, wherein each coverage counter from among the plurality of coverage counters is further configured to store multiple bits to indicate a number of times the particular software feature was used by the test.

6. The RTS system of claim 1, further comprising:
a control interface configured to provide start and stop commands to the agent.

7. The RTS system of claim 6, wherein the control interface is further configured to provide a unique identifier associated with the test to the agent along with the start command.

8. The RTS system of claim 7, wherein the agent is further configured to associate the unique identifier with the coverage data.

9. The RTS system of claim 6, wherein when no start command is received by the agent, the agent is further configured to associated the coverage data with a default identifier.

10. A method of remote test separation, comprising:
receiving a start test command to perform a first test from among a plurality of tests on an original software product instrumented for testing;
recording a utilization of a plurality of software features in a plurality of coverage counters;
receiving a stop test command;
storing, in response to receiving the stop test command, data from the plurality of coverage counters and associating the data with the first test;
iteratively repeating the receiving the start test command, recording the utilization, receiving the stop test command, and the storing for each remaining test from among the plurality of tests without starting and stopping the original software product to generate coverage data associated with the plurality of tests;
recording a plurality of associations between the plurality of software features and the plurality of tests.

11. The method of claim 10, further comprising:
resetting the plurality of coverage counters for a second test from among the plurality of tests.

12. The method of claim 10, further comprising:
associating each coverage counter from among the plurality of coverage counters with a particular software feature from among the plurality software features in the original software product.

13. The method of claim 12, further comprising:
storing one bit in each coverage counter from among the plurality of coverage counters to indicate whether the particular software feature was used in the plurality of tests.

14. The method of claim 12, further comprising:
storing multiple bits in each coverage counter from among the plurality of coverage counters to indicate a number of times the particular software was used in the plurality of tests.

15. The method of claim 10, wherein the receiving the start test command comprises:
receiving the start test command and the stop test command from a control interface.

16. The method of claim 15, wherein the receiving the start test command comprises:
receiving a unique identifier associated with the first test along with the start command.

17. The method of claim 16, further comprising:
associating the unique identifier with the coverage data.

18. The method of claim 10, further comprising:
associating the coverage data with a default identifier in response to not receiving a second start command to perform a second test from among the plurality of tests.

19. A system, comprising:
a shared memory accessible to an original software product instrumented for testing, the shared memory including a plurality of coverage counters;
a tester configured to run a plurality of tests on the original software product without starting and stopping the original software product;
an agent configured to:
receive a stop test indication at an end of a test from among the plurality of tests,
read the coverage data from the plurality of coverage counters at the end of the test,
write the coverage data from the plurality of coverage counters to a second memory, and
reset the plurality of coverage counters,
wherein the coverage data is configured to indicate an association between a plurality of software features and the test.

20. The system of claim 19, wherein at least one coverage counter from among the plurality of coverage counters comprises:
a one bit counter configured to indicate whether the test used a particular software feature from among the plurality of software features; and
a multi-bit counter configured to indicate a number of times the test used the particular software feature.

* * * * *